United States Patent
Afana et al.

(10) Patent No.: US 12,250,167 B2
(45) Date of Patent: Mar. 11, 2025

(54) SHARING OF SOUNDING REFERENCE SIGNALS (SRS) RESOURCES BETWEEN NEW RADIO AND LONG TERM EVOLUTION

(71) Applicant: Telefonaktiebolaget LM Ericsson (publ), Stockholm (SE)

(72) Inventors: Ali Afana, Kanata (CA); Karl Mann, Ottawa (CA); Gary Boudreau, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 17/760,560

(22) PCT Filed: Oct. 30, 2020

(86) PCT No.: PCT/IB2020/060244
§ 371 (c)(1),
(2) Date: Mar. 15, 2022

(87) PCT Pub. No.: WO2021/084513
PCT Pub. Date: May 6, 2021

(65) Prior Publication Data
US 2022/0376858 A1    Nov. 24, 2022

Related U.S. Application Data

(60) Provisional application No. 62/927,824, filed on Oct. 30, 2019.

(51) Int. Cl.
*H04L 5/00*    (2006.01)

(52) U.S. Cl.
CPC .................. *H04L 5/0048* (2013.01)

(58) Field of Classification Search
CPC ... H04L 5/0007; H04L 5/0037; H04L 5/0048; H04L 5/0051; H04W 72/04; H04W 72/21; H04W 72/23
USPC .......................... 370/252, 329, 468
See application file for complete search history.

(56) References Cited

U.S. PATENT DOCUMENTS

| | | | |
|---|---|---|---|
| 2018/0359781 A1 | 12/2018 | Yoon et al. | |
| 2020/0177342 A1* | 6/2020 | Pawar | H04W 72/23 |
| 2021/0144029 A1* | 5/2021 | Wang | H04L 5/0051 |

OTHER PUBLICATIONS

PCT International Search Report and Written Opinion, mailed Jan. 28, 2021 for International Application No. PCT/IB2020/060244, 14 pages.
Huawei et al., 3GPP TSG RAN WG1 Meeting #89, R1-1706905, "Overview of NR UL for LTE-NR Coexistence", Hangzhou, China, May 15-19, 2017, 13 pages, XP051272136.

(Continued)

*Primary Examiner* — Harun Chowdhury
(74) *Attorney, Agent, or Firm* — Sage Patent Group

(57) ABSTRACT

A method, system and apparatus are disclosed. According to one or more embodiments, a network node is provided. The network node includes processing circuitry configured to: assign a plurality of wireless devices respective sounding reference signal, SRS, sequences of a common set of SRS sequences where the common set of SRS sequences are shared among a first radio access technology, RAT, and a second RAT, and receive SRS sequences according to the assignment of the respective SRS sequences of the common set of SRS sequences.

16 Claims, 13 Drawing Sheets

(56) References Cited

OTHER PUBLICATIONS

Huawei et al., 3GPP TSG RAN WG1 Meeting #89, R1-1708171, "UL SRS Sequence Design in NR", Hangzhou, China, May 15-19, 2017, 10 pages, XP051273367.
3GPP, Technical Specification Group Radio Access Network, NR, "Physical Channels and Modulation", (Release 15), 3GPP TS 38.211 V15.3.0 (Sep. 2018), Valbonne, France, 96 pages.
3GPP, Technical Specification Group Radio Access Network, NR, "Physical Layer Procedures for Data" (Release 15), Bgpp Ts 38.214 V15.3.0 (Sep. 2018), Valbonne, France, 96 pages.
3GPP, Technical Specification Group Radio Access Network, Evolved Universal Terrestrial Radio Access (E-UTRA), Physical Channels and Modulation (Release 14), 3GPP TS 36.211 V14.12.0 (Sep. 2019), Valbonne, France, 7 pages.
Dahlman, Erik et al., "5G NR: The Next Generation Wireless Access Technology", Paperback ISBN: 9780128143230, Academic Press, Aug. 9, 2018, 12 Pages.

\* cited by examiner

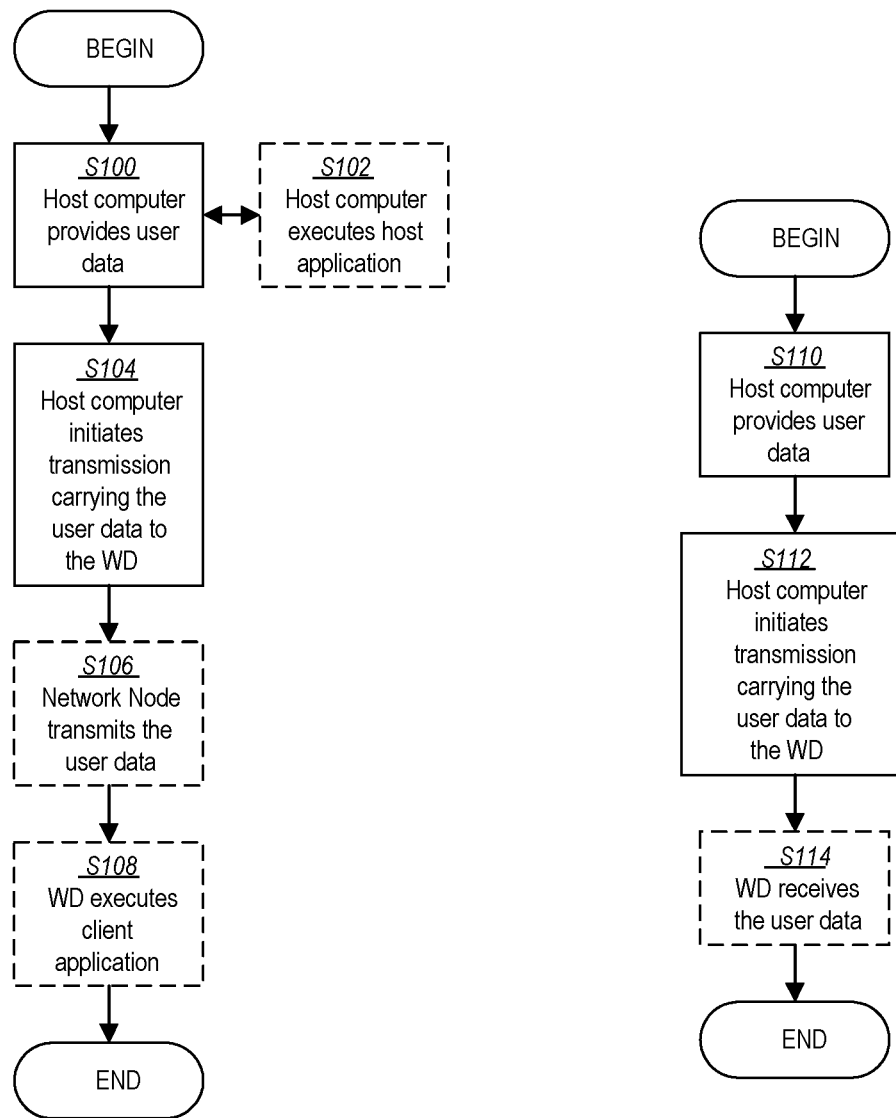

SHARING OF SOUNDING REFERENCE SIGNALS (SRS) RESOURCES BETWEEN NEW RADIO AND LONG TERM EVOLUTION

CROSS-REFERENCE TO RELATED APPLICATIONS

This application is a 35 U.S.C. § 371 national stage application for International Application No. PCT/IB2020/060244, entitled "SHARING OF SOUNDING REFERENCE SIGNALS (SRS) RESOURCES BETWEEN NEW RADIO AND LONG TERM EVOLUTION", filed on Oct. 30, 2020, the disclosure of which is hereby incorporated by reference in its entirety. Further, the present application claims the benefit of and priority to U.S. Provisional Patent Application No. 62/927,824, filed on Oct. 30, 2019, entitled "SHARING OF SOUNDING REFERENCE SIGNALS (SRS) RESOURCES BETWEEN NEW RADIO AND LONG TERM EVOLUTION", the disclosure of which is hereby incorporated by reference in its entirety.

TECHNICAL FIELD

The present disclosure relates to wireless communications, and in particular, to spectrum sharing between Long Term Evolution (LTE) and New Radio (NR) wireless devices.

BACKGROUND

Spectrum sharing is a promising technology that allows operators to make use of current $3^{rd}$ Generation Partnership Project (3GPP) Long Term Evolution (LTE) wireless communication radio spectrum (referred to generally herein as "spectrum") bands to migrate $5^{th}$ Generation (5G) (also called "New Radio (NR)") applications without the extra costs of acquiring new 5G NR spectrum or 5G radio and baseband hardware. Spectrum sharing allows LTE and NR to coexist and share operations in a single band with a minimum impact on the LTE side.

The spectrum sharing techniques adopted between NR and LTE radio access technologies (RATs) may be implemented on a static frequency division multiplexing (FDM) or time division multiplexing (TDM) basis, as well as dynamic or instantaneous sharing on a TDM basis. The spectrum sharing between LTE and NR transmissions may be managed by avoiding the collision with LTE dedicated signals including Cell-specific Reference Signals (CRS), and sync block signals, e.g., primary synchronization signals (PSS) and secondary synchronization signals (SSS). This can be done by re-allocating NR signals or rate matching around the always-transmitted LTE signals.

Alternately, to rate match around LTE dedicated signals, e.g., LTE PSS/SSS, it is possible to use resource block (RB) and symbol level granularity to define specific patterns in the time/frequency domain that are repeated with a specific periodicity. These block-based patterns may be are expressed by two bit maps; namely, a frequency domain bit map with granularity of one RB and a time domain bit map with granularity of one orthogonal frequency-division multiplexing (OFDM) symbol.

Uplink (UL) sounding reference signals (SRS) may be exploited by the base station for channel-state estimation to enable uplink channel-dependent scheduling and link adaptation. The SRS can also be used in other cases such as helping the network to be able to estimate the uplink receive timing as part of the uplink-timing-alignment procedure.

SRS is a frequency-domain reference-signal sequence that is defined by cyclic shifts of prime-length Zadoff Chu (ZC) sequences for sequence lengths equal to M, e.g., 30 in LTE. A ZC sequence, also referred to as a Chu sequence or Frank-Zadoff-Chu (FZC) sequence, is a complex-valued mathematical sequence which, when applied to a signal, gives rise to a new signal of constant amplitude. When cyclically shifted versions of a Zadoff-Chu sequence are imposed upon a signal the resulting set of signals detected at the receiver are uncorrelated with one another. The length of the sequence M is defined by the SRS bandwidth, which is a multiple of 4 physical resource blocks (PRBs). SRS is mapped to every second, or fourth subcarrier, creating a "comb"-like spectrum, i.e., comb level 2 or comb level 4. Maximum cyclic shifts are 8 for a comb 2 and 12 for a comb 4.

For implementation of SRS functionality, in some configurations, NR utilizes the same SRS format as LTE. Specifically, there are 17 LTE configurations from 64 possible configurations in the range of (4, 272) physical resource blocks (PRBs). For a bandwidth (BW)<=96 PRBs, there are the same 17 LTE configurations and 8 new ones. For the bandwidth configurations between 96<BW<=272, 39 new configurations are introduced for NR.

For spectrum sharing between NR and LTE, separate SRS processes may have to be implemented for each of LTE and NR resulting in less efficient use of available PRB's in the uplink (UL) shared spectrum (i.e., additional SRS-PRBs, based on the configured SRS-Bandwidth will be required for over-the-air transmission).

SUMMARY

Some embodiments advantageously provide methods, systems, and apparatuses for a spectrum sharing solution between LTE and NR that allows a common set of SRS sequences to be assigned to LTE or NR wireless devices that reduce the number of PRBs that have to be reserved for sounding, and instead may use them to allocate more resources to the physical uplink shared channel (PUSCH) and physical uplink control channel PUCCH.

An embodiment directed toward an LTE/NR spectrum sharing solution allows a common set of SRS sequences to be assigned to LTE and NR wireless devices in a defined manner that minimizes the number of PRBs that have to be reserved for SRS processing. A single SRS process can then be employed for UL channel estimation of either the LTE or NR wireless devices in the shared spectrum. As a result, more physical resource blocks are available to be allocated to the PUSCH and PUCCH.

According to one aspect of the disclosure, a network node is provided. The network node includes processing circuitry configured to: assign a plurality of wireless devices respective sounding reference signal, SRS, sequences of a common set of SRS sequences where the common set of SRS sequences is shared among a first radio access technology, RAT, and a second RAT, and receive SRS sequences according to the assignment of the respective SRS sequences of the common set of SRS sequences.

According to one or more embodiments, the common set of sequences are partitioned equally among first RAT wireless devices and second RAT wireless devices. According to one or more embodiments, the common set of sequences are partitioned based at least on a fraction of deployments of first RAT wireless devices and second RAT wireless devices.

According to one or more embodiments, the common set of sequences are partitioned based at least on a ratio of bandwidth parts (BWPs) associated with second RAT wireless devices to a total bandwidth of shared spectrum.

According to one or more embodiments, the processing circuitry is further configured to: determine a first region in a first RAT cell fails to overlap with second region in a second RAT cell; and configure the first region in the first RAT cell and the second region in the second RAT cell to reuse SRS sequences. According to one or more embodiments, the common set of SRS sequences are configured for a time division duplex, TDD, same numerology non-standalone spectrum sharing between the first RAT and second RAT. According to one or more embodiments, the assignment of the respective SRS sequences of the common set of SRS sequences is indicated using radio resource control, RRC, signaling. According to one or more embodiments, a first set of SRS sequences of the common set of SRS sequences are assigned to a first set of first RAT beams and a second set of SRS sequence of the common set of SRS sequence are assigned to a second set of second RAT beams.

According to another aspect of the disclosure, a method implemented by a network node is provided. A plurality of wireless devices are assigned respective sounding reference signal, SRS, sequences of a common set of SRS sequences where the common set of SRS sequences are shared among a first radio access technology, RAT, and a second RAT. SRS sequences are received according to the assignment of the respective SRS sequences of the common set of SRS sequences. According to one or more embodiments, the common set of sequences are partitioned equally among first RAT wireless devices and second RAT wireless devices. According to one or more embodiments, the common set of sequences are partitioned based at least on a fraction of deployments of first RAT wireless devices and second RAT wireless devices.

According to one or more embodiments, the common set of sequences are partitioned based at least on a ratio of bandwidth parts (BWPs) associated with second RAT wireless devices to a total bandwidth of shared spectrum. According to one or more embodiments, a determination is made that a first region in a first RAT cell fail to overlap with second region in a second RAT cell. The first region in the first RAT cell and the second region in the second RAT cell are configured to reuse SRS sequences. According to one or more embodiments, the common set of SRS sequences are configured for a time division duplex, TDD, same numerology non-standalone spectrum sharing between the first RAT and second RAT.

According to one or more embodiments, the assignment of the respective SRS sequences of the common set of SRS sequences is indicated using radio resource control, RRC, signaling. According to one or more embodiments, a first set of SRS sequences of the common set of SRS sequences are assigned to a first set of first RAT beams and a second set of SRS sequence of the common set of SRS sequence are assigned to a second set of second RAT beams.

According to another aspect of the disclosure, a wireless device configured to communicate with a network node is provided. The wireless device includes processing circuitry configured to: receive an assignment of a first sounding reference signal, SRS, sequence of a common set of SRS sequences, the common set of SRS sequences being shared among a first radio access technology, RAT, and a second RAT; and transmit the first SRS sequence according to the assignment.

According to one or more embodiments, the common set of sequences are partitioned equally among first RAT wireless devices and second RAT wireless devices. According to one or more embodiments, the common set of sequences are partitioned based at least on a fraction of deployments of first RAT wireless devices and second RAT wireless devices. According to one or more embodiments, the common set of sequences are partitioned based at least on a ratio of bandwidth parts (BWPs) associated with second RAT wireless devices to a total bandwidth of shared spectrum.

According to one or more embodiments, the common set of SRS sequences are configured for a time division duplex, TDD, same numerology non-standalone spectrum sharing between the first RAT and second RAT. According to one or more embodiments, the assignment is indicated using radio resource control, RRC, signaling. According to one or more embodiments, a first set of SRS sequences of the common set of SRS sequences are assigned to a first set of first RAT beams and a second set of SRS sequence of the common set of SRS sequence are assigned to a second set of second RAT beams.

According to another aspect of the disclosure, a method implemented by a wireless device that is configured to communicate with a network node is provided. An assignment of a first sounding reference signal, SRS, sequence of a common set of SRS sequences is received where the common set of SRS sequences is shared among a first radio access technology, RAT, and a second RAT. The first SRS sequence are transmitted according to the assignment.

According to one or more embodiments, the common set of sequences are partitioned equally among first RAT wireless devices and second RAT wireless devices. According to one or more embodiments, the common set of sequences are partitioned based at least on a fraction of deployments of first RAT wireless devices and second RAT wireless devices. According to one or more embodiments, the common set of sequences are partitioned based at least on a ratio of bandwidth parts (BWPs) associated with second RAT wireless devices to a total bandwidth of shared spectrum.

According to one or more embodiments, the common set of SRS sequences are configured for a time division duplex, TDD, same numerology non-standalone spectrum sharing between the first RAT and second RAT. According to one or more embodiments, the assignment is indicated using radio resource control, RRC, signaling. According to one or more embodiments, a first set of SRS sequences of the common set of SRS sequences are assigned to a first set of first RAT beams and a second set of SRS sequence of the common set of SRS sequence are assigned to a second set of second RAT beams.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
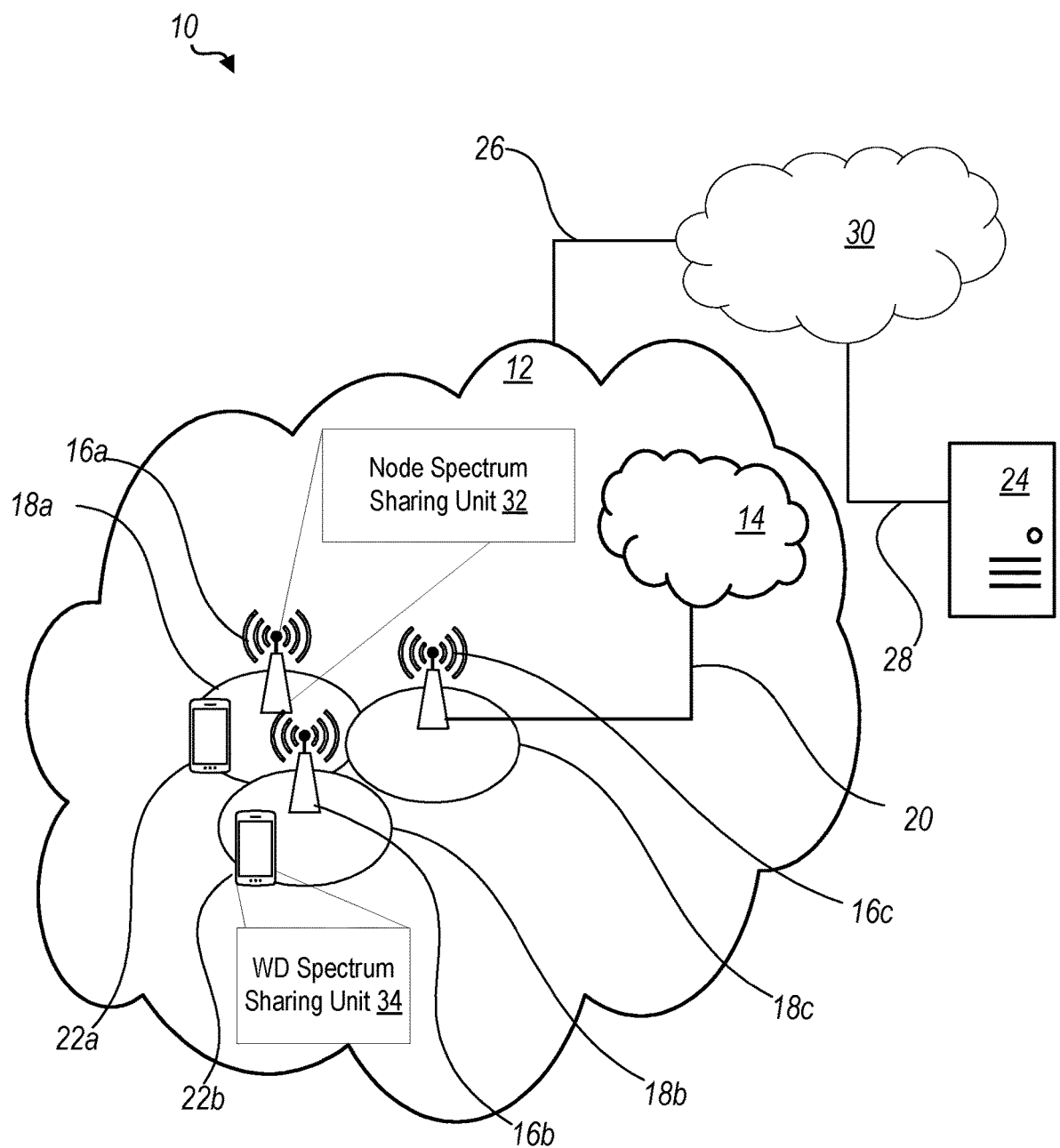
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to supporting spectrum sharing between LTE and NR that allows a common set of SRS sequences to be assigned to LTE or NR WD's, reducing the number of PRBs that have to be reserved for sounding and may instead use the PRBs to allocate more PUSCH and PUCCH. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMAX), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide a spectrum sharing solution between LTE and NR that allows a common set of SRS sequences to be assigned to LTE or NR WD's that reduces the number of PRBs that have to be reserved for sounding, instead allowing use of the PRBs to allocate more PUSCH and PUCCH.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16 is configured to include a node spectrum sharing unit 32 which is configured to identify at least one common sounding reference signal (SRS) sequence for at least one Long Term Evolution (LTE) WD and at least one New Radio (NR) WD; and allocate at least one physical resource block (PRB) reserved for the at least one common SRS sequence to at least one of a physical uplink shared channel (PUSCH) and a physical uplink control channel (PUCCH). A wireless device 22 is configured to include a WD spectrum sharing unit 34 which is configured to use at least one physical resource block (PRB) reserved for at least one sounding reference signal (SRS) sequence for at least one of a physical uplink shared channel (PUSCH) and/or a physical uplink control channel (PUCCH).

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include a monitoring unit 54 configured to enable the service provider to monitor the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuits) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include node spectrum sharing unit 32 configured to identify at least one common sounding reference signal (SRS) sequence for at least one Long Term Evolution (LTE) WD and at least one New Radio (NR) WD; and allocate at least one physical resource block (PRB) reserved for the at least one common SRS sequence to at least one of a physical uplink shared channel (PUSCH) and a physical uplink control channel (PUCCH).

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a WD spectrum sharing unit 34 configured to use at least one physical resource block (PRB) reserved for at least one sounding reference signal (SRS) sequence for at least one of a physical uplink shared channel (PUSCH) and a physical uplink control channel (PUCCH).

Figure 2:
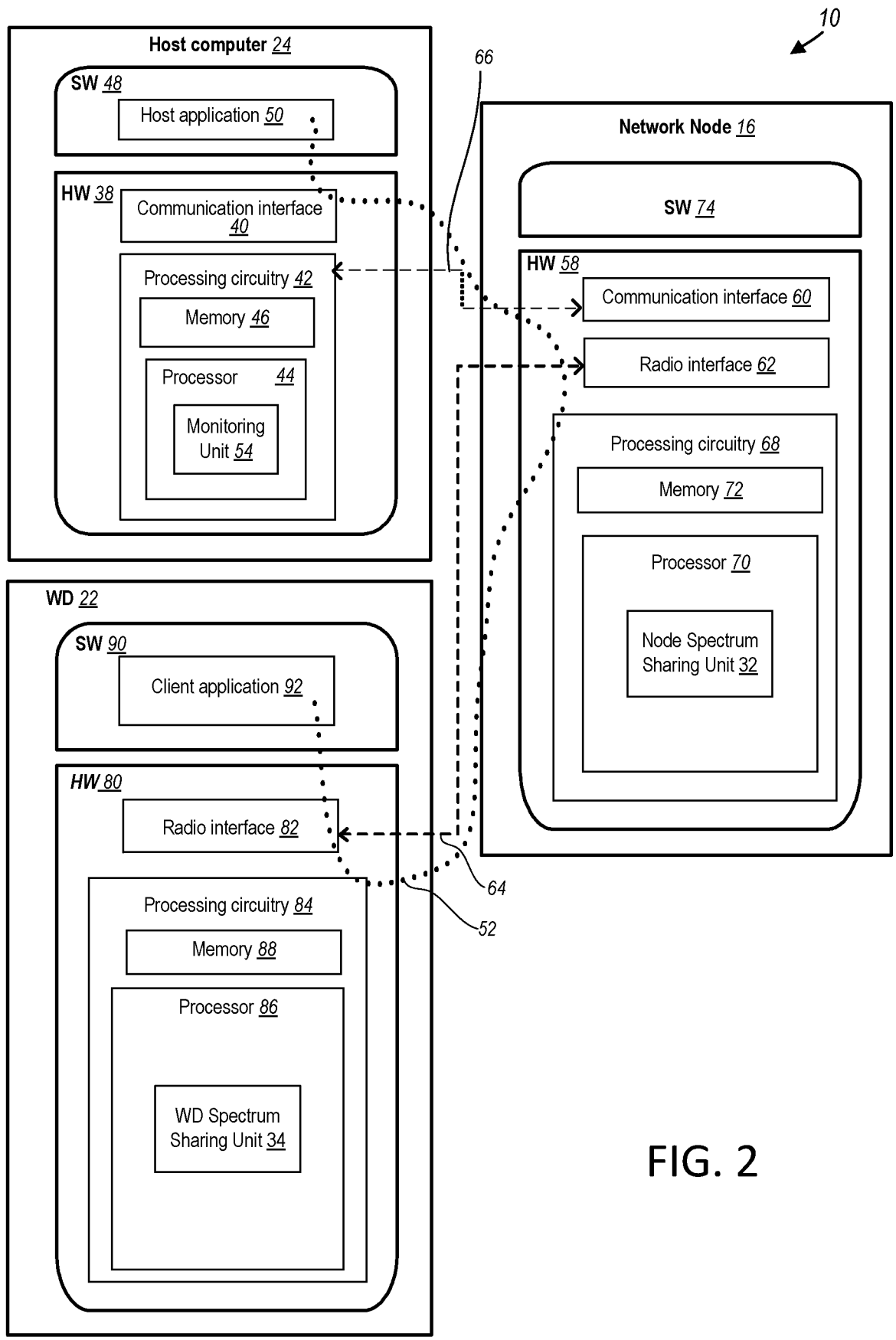
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62.

In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as node spectrum sharing unit 32, and WD spectrum sharing unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
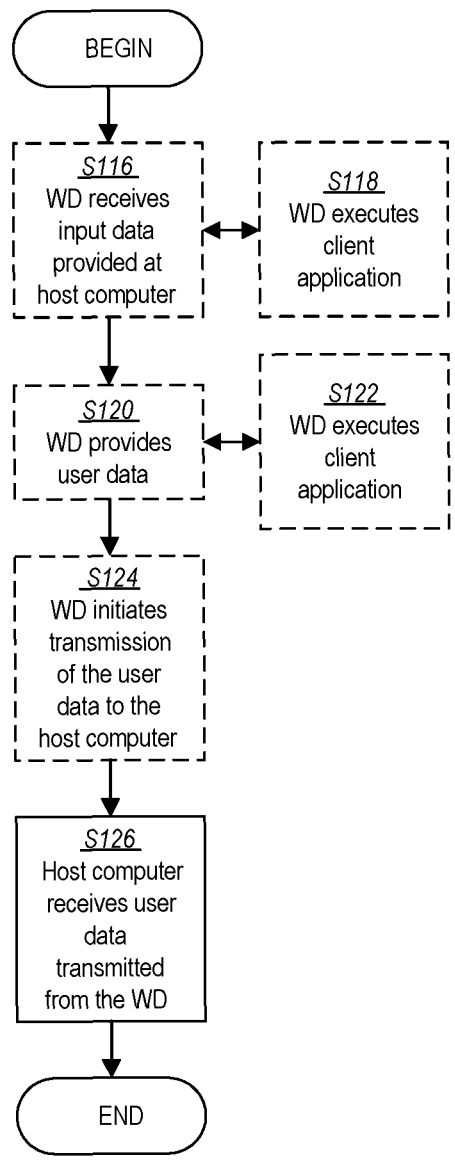
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
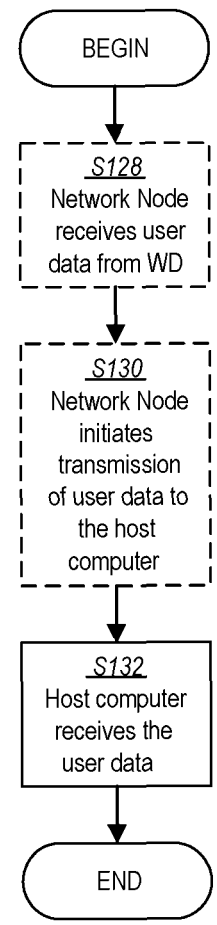
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
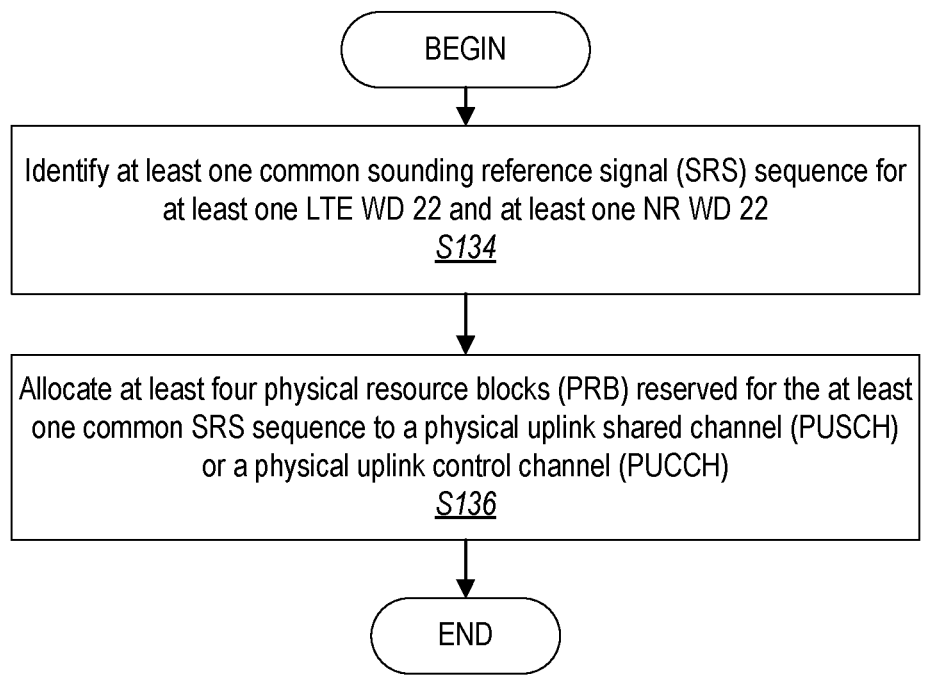
FIG. 7 is a flowchart of an exemplary process in a network node for spectrum sharing between LTE and NR wireless devices according to some embodiments of the present disclosure.

FIG. 7 is a flowchart of an exemplary process in a network node 16 for spectrum sharing between LTE and NR wireless devices 22 according to some embodiments of the present disclosure. One or more Blocks and/or functions performed by network node 16 may be performed by one or more elements of network node 16 such as by node spectrum sharing unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to identify (Block S134) at least one common sounding reference signal (SRS) sequence for at least one Long Term Evolution (LTE) WD 22 and at least one New Radio (NR) WD 22. In one or more embodiments, network node 16 such as via one or more of processing circuitry 68, processor 70, radio interface 62 and communication interface 60 is configured to allocate (Block S136) at least four physical resource blocks (PRB) reserved for the at least one common SRS sequence to a physical uplink shared channel (PUSCH) or a physical uplink control channel (PUCCH).

In one or more embodiments, the at least one common SRS sequence further comprises the common Zadoff-Chu root sequences of the SRS for the at least one LTE wireless device 22 and at least one NR wireless device 22. In one or more embodiments, network node 16 such as via one or more of processing circuitry 68, processor 70, radio interface 62 and communication interface 60 is configured to employ a single SRS process for uplink (UL) channel estimation of one of the at least one LTE wireless device 22 and at least one NR wireless device 22 in a shared spectrum of the at least one LTE wireless device 22 and at least one NR wireless device 22. In one or more embodiments, network node 16 such as via one or more of processing circuitry 68, processor 70, radio interface 62 and communication interface 60 is configured to use an existing SRS configuration message in a Radio Resource Control (RRC) Connection Setup and an RRC Connection Reconfiguration to signal an SRS configuration.

Figure 8:
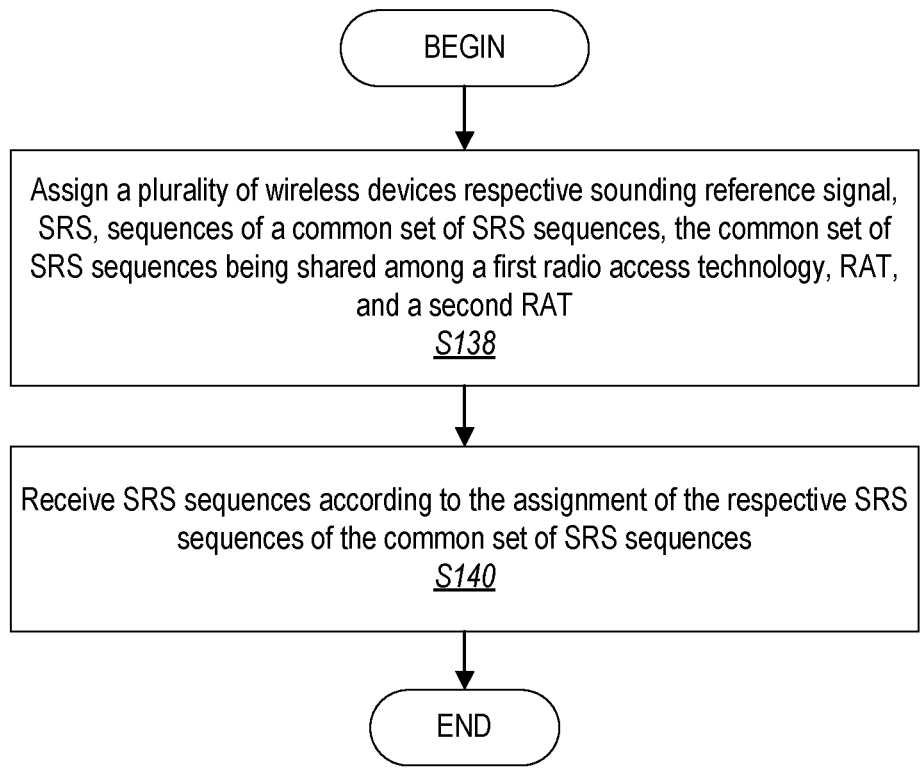
FIG. 8 is a flowchart of an exemplary process in a network node according to some embodiments of the present disclosure.

In one or more embodiments, network node 16 such as via one or more of processing circuitry 68, processor 70, radio interface 62 and communication interface 60 is configured to partition the at least one SRS sequence between the LTE WD 22 and the NR WD 22 based at least on a relative ratio of the NR BWP to the total bandwidth of the shared spectrum. In one or more embodiments, network node 16 such as via one or more of processing circuitry 68, processor 70, radio interface 62 and communication interface 60 is configured to partition the at least one SRS sequence based at least on part on a distribution of LTE WDs 22 and NR WDs 22. In one or more embodiments, network node 16 such as via one or more of processing circuitry 68, processor 70, radio interface 62 and communication interface 60 is configured to re-use the SRS across different beam assignments. FIG. 8 is a flowchart of an exemplary process in a network node 16 according to some embodiments of the present disclosure. One or more Blocks and/or functions performed by network node 16 may be performed by one or more elements of network node 16 such as by node spectrum sharing unit 32 in processing circuitry 68, processor 70, communication interface 60, radio interface 62, etc. In one or more embodiments, network node 16 such as via one or more of processing circuitry 68, processor 70, radio interface 62 and communication interface 60 is configured to assign (Block S138) a plurality of wireless devices respective sounding reference signal, SRS, sequences of a common set of SRS sequences where the common set of SRS sequences are shared among a first radio access technology, RAT, and a second RAT, as described herein. In one or more embodiments, network node 16 such as via one or more of processing circuitry 68, processor 70, radio interface 62 and communication interface 60 is configured to receive (Block S140) SRS sequences according to the assignment of the respective SRS sequences of the common set of SRS sequences, as described herein.

According to one or more embodiments, the common set of sequences are partitioned equally among first RAT wireless devices 22 and second RAT wireless devices 22. According to one or more embodiments, the common set of sequences are partitioned based at least on a fraction of deployments of first RAT wireless devices 22 and second RAT wireless devices 22. According to one or more embodiments, the common set of sequences are partitioned based at least on a ratio of bandwidth parts (BWPs) associated with second RAT wireless devices 22 to a total bandwidth of shared spectrum. According to one or more embodiments, the processing circuitry 68 is further configured to: determine a first region in a first RAT cell fails to overlap with second region in a second RAT cell; and configure the first region in the first RAT cell and the second region in the second RAT cell to reuse SRS sequences.

According to one or more embodiments, the common set of SRS sequences are configured for a time division duplex, TDD, same numerology non-standalone spectrum sharing between the first RAT and second RAT. According to one or more embodiments, the assignment of the respective SRS sequences of the common set of SRS sequences is indicated using radio resource control, RRC, signaling. According to one or more embodiments, a first set of SRS sequences of the common set of SRS sequences are assigned to a first set of first RAT beams and a second set of SRS sequence of the common set of SRS sequence are assigned to a second set of second RAT beams.

Figure 9:
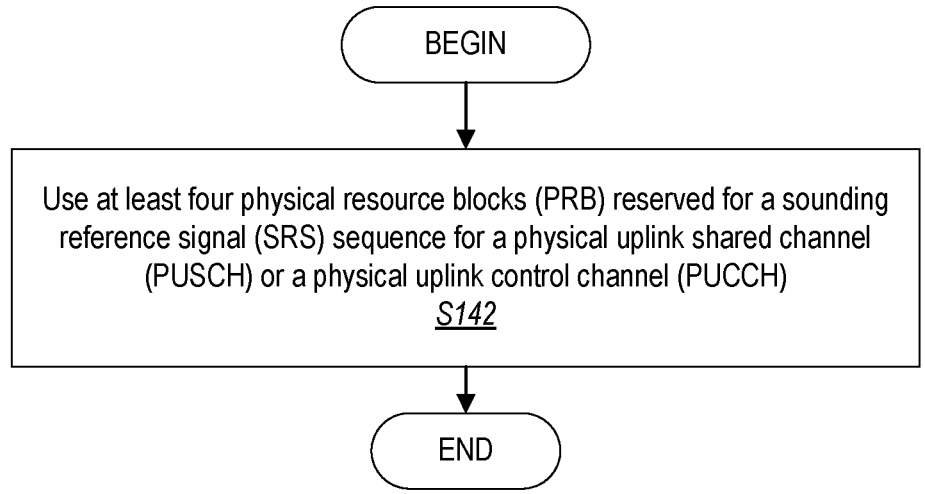
FIG. 9 is a flowchart of an exemplary process in a wireless device for spectrum sharing between LTE and NR wireless devices according to some embodiments of the present disclosure.

FIG. 9 is a flowchart of an exemplary process in a wireless device 22 for spectrum sharing between LTE and NR wireless devices 22 according to some embodiments of the present disclosure. One or more Blocks and/or functions performed by wireless device 22 may be performed by one or more elements of wireless device 22 such as by WD spectrum sharing unit 34 in processing circuitry 84, processor 86, radio interface 82, etc. In one or more embodiments, wireless device 22 such as via one or more of processing circuitry 84, processor 86 and radio interface 82 is configured to use (Block S142) at least four physical resource blocks (PRB) reserved for at least one sounding reference signal (SRS) sequence for a physical uplink shared channel (PUSCH) or a physical uplink control channel (PUCCH).

In one or more embodiments, the at least one SRS sequence further comprises the common Zadoff-Chu root sequences of the SRS for at least one Long Term Evolution (LTE) WD 22 and at least one New Radio (NR) wireless device 22.

In one or more embodiments, wireless device 22 such as via one or more of processing circuitry 84, processor 86 and radio interface 82 is configured to receive an SRS configuration in an existing SRS configuration message in at least one of a Radio Resource Control (RRC) Connection Setup and an RRC Connection Reconfiguration.

Figure 10:
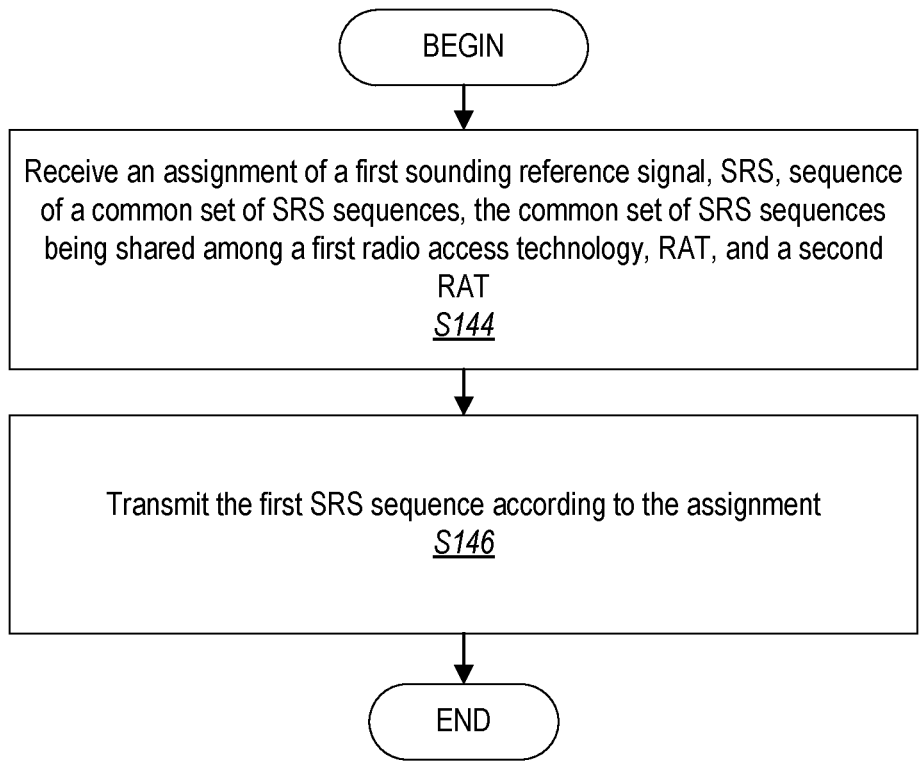
FIG. 10 is a flowchart of an exemplary process in a wireless device according to some embodiments of the present disclosure.

FIG. 10 is a flowchart of an exemplary process in a wireless device 22 according to some embodiments of the present disclosure. One or more Blocks and/or functions performed by wireless device 22 may be performed by one or more elements of wireless device 22 such as by WD spectrum sharing unit 34 in processing circuitry 84, processor 86, radio interface 82, etc. In one or more embodiments, wireless device 22 such as via one or more of processing circuitry 84, processor 86 and radio interface 82 is configured to receive (Block S144) an assignment of a first sounding reference signal, SRS, sequence of a common set of SRS sequences where the common set of SRS sequences are shared among a first radio access technology, RAT, and a second RAT, as described herein. In one or more embodiments, wireless device 22 such as via one or more of processing circuitry 84, processor 86 and radio interface 82 is configured to transmit (Block S146) the first SRS sequence according to the assignment, as described herein.

According to one or more embodiments, the common set of sequences are partitioned equally among first RAT wireless devices and second RAT wireless devices 22. According to one or more embodiments, the common set of sequences are partitioned based at least on a fraction of deployments of first RAT wireless devices 22 and second RAT wireless devices 22. According to one or more embodiments, the common set of sequences are partitioned based at least on a ratio of bandwidth parts (BWPs) associated with second RAT wireless devices 22 to a total bandwidth of shared spectrum.

According to one or more embodiments, the common set of SRS sequences are configured for a time division duplex, TDD, same numerology non-standalone spectrum sharing between the first RAT and second RAT. According to one or more embodiments, the assignment is indicated using radio resource control, RRC, signaling. According to one or more embodiments, a first set of SRS sequences of the common set of SRS sequences are assigned to a first set of first RAT beams and a second set of SRS sequence of the common set of SRS sequence are assigned to a second set of second RAT beams.

Having described the general process flow of arrangements of the disclosure and having provided examples of hardware and software arrangements for implementing the processes and functions of the disclosure, the sections below provide details and examples of arrangements for supporting a spectrum sharing solution between LTE and NR, that allows a common set of SRS sequences to be assigned to LTE or NR WD's 22 that reduce the number of PRBs that have to be reserved for sounding and may instead use them to allocate more PUSCH and PUCCH.

It is noted that references are made below to one or more of WD 22 and/or network node 16 performing certain functions. Functions performed by a network node 16 can be performed by one or more of the elements shown as comprised in network node 16, such as, but not limited to processing circuitry 68, node spectrum sharing unit 32, communication interface 60 and/or radio interface 62. Functions performed by a WD 22 can be performed by one or more of the elements shown as comprised in WD 22, such as, but not limited to processing circuitry 84, WD spectrum sharing unit 34, and/or radio interface 82.

One embodiment provides a Frequency Division Duplexing (FDD)/Time Division Duplexing (TDD) same numerology Non-Standalone (NSA) spectrum sharing arrangement between NR and LTE SRS functionality on a single carrier of total bandwidth (BW) in which the common Zadoff-Chu root sequences of the SRS for the NR and LTE WDs 22 may be assigned to an NR WD 22 or LTE WD 22. As explained above, in some embodiments, 17 LTE configurations are typically common between the LTE and NR RATs. From the perspective of the network, e.g., the network node 16, it may not matter whether the UL SRS was sent by the LTE WD 22 or NR WD 22 if the transmitted sequence is the same. However, these common sequences can be re-used or partitioned between the LTE and NR WDs 22.

The partitioning may be implemented such as via one or more of processing circuitry 68, node spectrum sharing unit 32, etc., using one of the following example methods; equally between NR and LTE; or between NR and LTE based on the fraction of WDs 22 for each of the NR and LTE deployments.

For NR WD's 22 assigned a Bandwidth Part (BWP) in the shared spectrum, the SRS sequences can be partitioned such as via one or more of processing circuitry 68, node spectrum sharing unit 32, etc., between LTE and NR WD's 22 based on the relative ratio of the NR BWP to the total bandwidth of the shared spectrum.

Due to the commonality of SRS sequences between LTE and NR, the existing SRS configuration message in the RRC Connection Setup and RRC Connection Reconfiguration may be employed to signal the SRS configuration, e.g., through use of the srs-ConfigIndex and transmissionComb fields of the RRC message. Table 1 (referenced from 3GPP Technical Specification (TS) 38.211 Table 6.4.1.4.3-1) highlights the NR SRS configurations that are similar with SRS LTE shown in bold and italicized in Table 1.

TABLE 1

NR SRS configurations that are similar with SRS LTE
<3GPP TS 38.211-Table 6.4.1.4.3-1: SRS bandwidth configuration>

| $C_{SRS}$ | $B_{SRS}=0$ | | $B_{SRS}=1$ | | $B_{SRS}=2$ | | $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| *0* | 4 | 1 | 4 | 1 | 4 | 1 | 4 | 1 |
| *1* | 8 | 1 | 4 | 2 | 4 | 1 | 4 | 1 |
| *2* | 12 | 1 | 4 | 3 | 4 | 1 | 4 | 1 |
| *3* | 16 | 1 | 4 | 4 | 4 | 1 | 4 | 1 |
| 4 | 16 | 1 | 8 | 2 | 4 | 2 | 4 | 1 |
| *5* | 20 | 1 | 4 | 5 | 4 | 1 | 4 | 1 |
| *6* | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| *9* | 32 | 1 | 16 | 2 | 8 | 2 | 4 | 2 |
| *10* | 36 | 1 | 12 | 3 | 4 | 3 | 4 | 1 |
| *11* | 40 | 1 | 20 | 2 | 4 | 5 | 4 | 1 |
| *12* | 48 | 1 | 16 | 3 | 8 | 2 | 4 | 2 |
| *13* | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| *16* | 60 | 1 | 20 | 3 | 4 | 5 | 4 | 1 |
| *17* | 64 | 1 | 32 | 2 | 16 | 2 | 4 | 4 |
| *18* | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| *21* | 80 | 1 | 40 | 2 | 20 | 2 | 4 | 5 |
| 22 | 88 | 1 | 44 | 2 | 4 | 11 | 4 | 1 |
| *23* | 96 | 1 | 32 | 3 | 16 | 2 | 4 | 4 |
| *24* | 96 | 1 | 48 | 2 | 24 | 2 | 4 | 6 |

TABLE 2

Example LTE SRS BW configurations

| SRS bandwidth configuration $C_{SRS}$ | SRS-bandwidth $B_{SRS}=0$ | | SRS-bandwidth $B_{SRS}=1$ | | SRS-bandwidth $B_{SRS}=2$ | | SRS-bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| $m_{SRS,b}$ and $N_b$, b = 0,1,2,3, values for uplink bandwidth of $6 < N^{UL}_{RB} < 40$ | | | | | | | | |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |
| $m_{SRS,b}$ and $N_b$, b = 0,1,2,3, values for uplink bandwidth of $40 < N^{UL}_{RB} < 60$ | | | | | | | | |
| 0 | 48 | 2 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |
| $m_{SRS,b}$ and $N_b$, b = 0,1,2,3, values for uplink bandwidth of $60 < N^{UL}_{RB} < 80$ | | | | | | | | |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

TABLE 2-continued

Example LTE SRS BW configurations

| SRS bandwidth configuration $C_{SRS}$ | SRS-bandwidth $B_{SRS} = 0$ | | SRS-bandwidth $B_{SRS} = 1$ | | SRS-bandwidth $B_{SRS} = 2$ | | SRS-bandwidth $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| $m_{SRS,b}$ and $N_b$, b = 0,1,2,3, values for uplink bandwidth of $80 < N^{UL}_{RB} < 110$ | | | | | | | | |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

Some embodiments may include an extension of the above discussed embodiments for use of the SRS in a spectrum sharing scenario employing a mixed NR standalone (SA) plus LTE scenario. For these embodiments, the same method as defined above may be employed for scenarios in which there is a one-to-one correspondence between the LTE and NR cells employing spectrums sharing. In scenarios for which the NR and LTE cells have regions that are not overlapping, no sharing of SRS sequences is required.

One embodiment provides an extension of the above discussed embodiments for use of SRS in an NSA TDD same numerology spectrum sharing scenario. The methods defined in the above discussion can also apply to TDD implementations of LTE and NR. One embodiment makes use of NR SRS beam assignments and M-port SRS with spatial filtering to a number (N) of antennas through the SRS resource indicator (SRI). Embodiments may re-use the NR SRS and LTE SRS across different beam assignments.

Figures 11, 12:
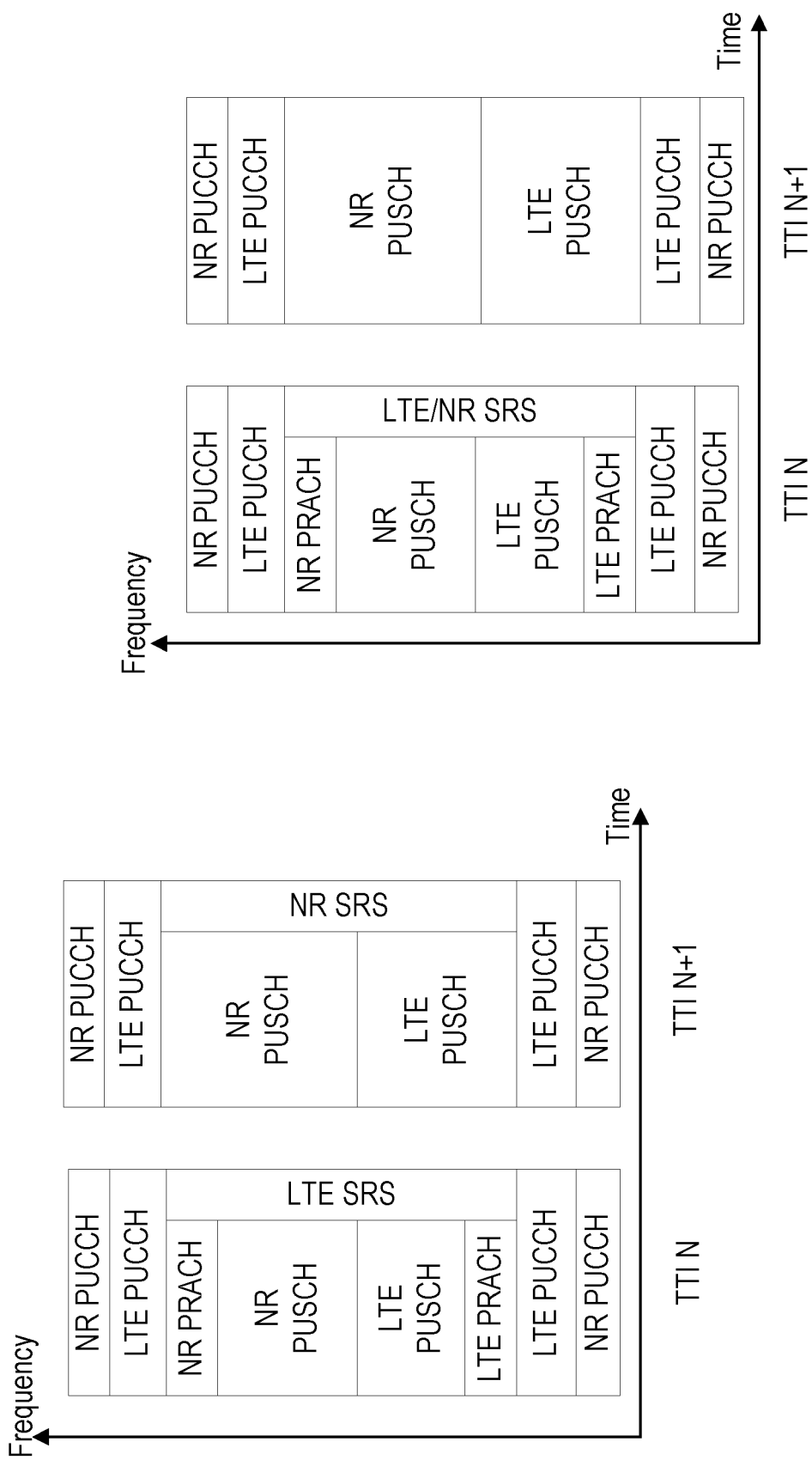
FIG. 11 is an example of a sounding reference signal frequency assignment in spectrum sharing according to some embodiments of the present disclosure.
FIG. 12 is another example of a sounding reference signal frequency assignment in spectrum sharing according to some embodiments of the present disclosure.

FIG. 11 is an illustration of an example sounding reference signal frequency assignment for spectrum sharing that may be implemented by network node 16 such as via one or more of processing circuitry 68, node spectrum sharing unit 32, etc., according to some embodiments of the present disclosure as set forth below. FIG. 12 is an illustration of another example sounding reference signal frequency assignment for spectrum sharing that may be implemented by network node 16 such as via one or more of processing circuitry 68, node spectrum sharing unit 32, etc., according to some embodiments of the present disclosure as set forth below.

Figure 13:
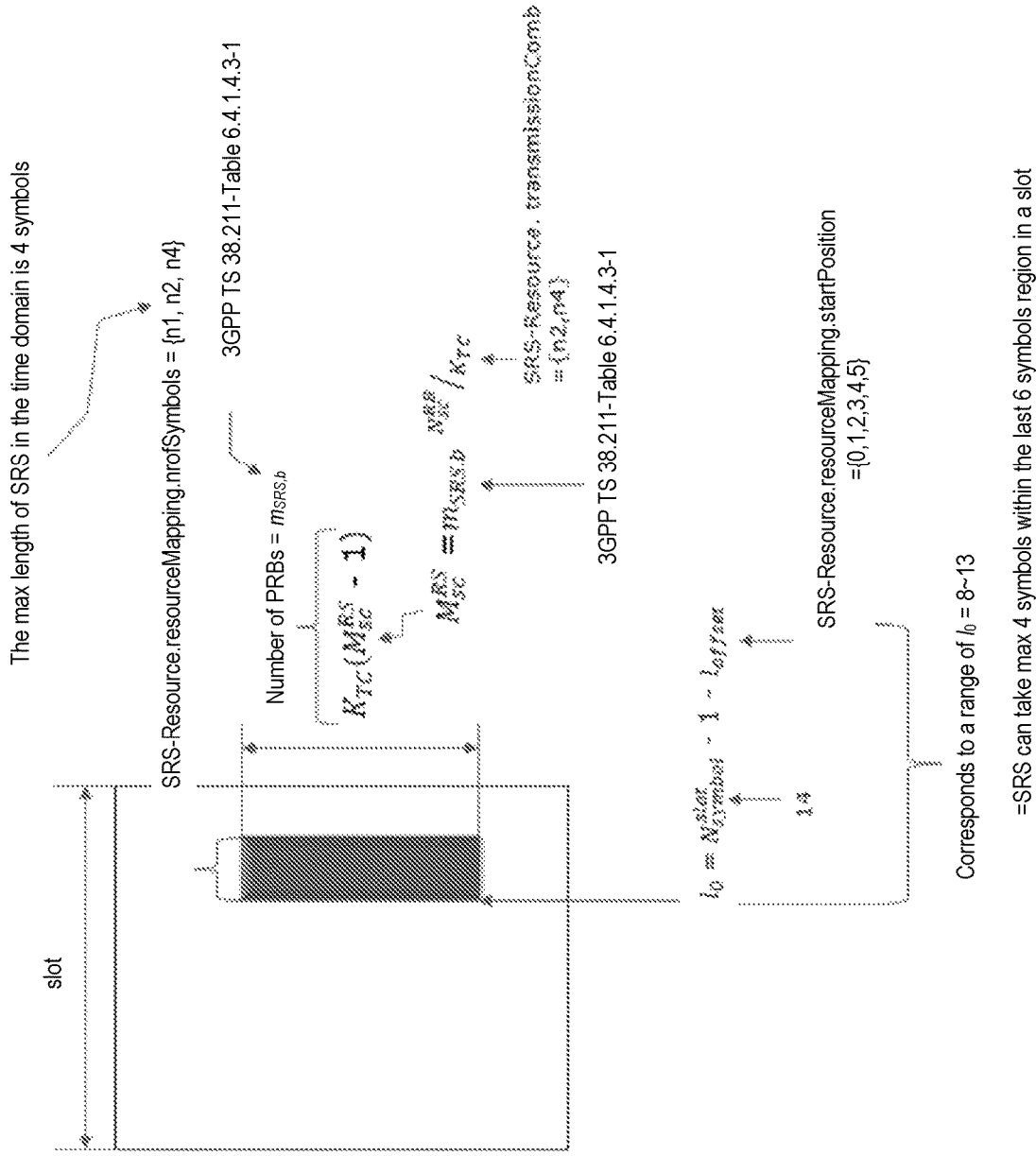
FIG. 13 is an illustration of example parameters defining sounding reference signal resources within a slot according to some embodiments of the present disclosure.

NR SRS resource configuration
　Mapping to physical resources
　　Time: in the last 6 symbols of an uplink slot
　　Frequency: starting position is configurable to align on a common grid with 4 PRB granularity
　Time domain
　　Periodic/semi-persistent
　　　Per SRS resource configuration of periodicity and slot offset, all SRS resources within an SRS resource set have same periodicities
　　　Periodicity: {1, 2, 4, 5, 8, 10, 16, 20, 32, 40, 64, 80, 160, 320, 640, 1280, 2560} slots
　　　Slot offset: all possible for each periodicity
　　Aperiodic
　　　Transmission of SRS resource set(s) triggered using a configured 2-bit SRS request field in DCI formats 1_1 and 0_1
　　　Per SRS resource set configuration of slot offset with respect to DCI
　　　Slot offset: {1, . . . 32}
　Frequency hopping
　　Frequency domain64 possible configurations in the range [4, 272] PRB s
　　Inter-slot (i.e., per resource) within a BWP
　　Intra-slot (i.e., per symbol) for multi-symbol resources
　Port multiplexing
　　Cyclic shift separation between ports on the same comb
　　Port pairs of 4-port resource can be on different comb offset FIG. 13 is an illustration of example parameters defining sounding reference signal resources within a slot according to some embodiments of the present disclosure.

Figure 15:
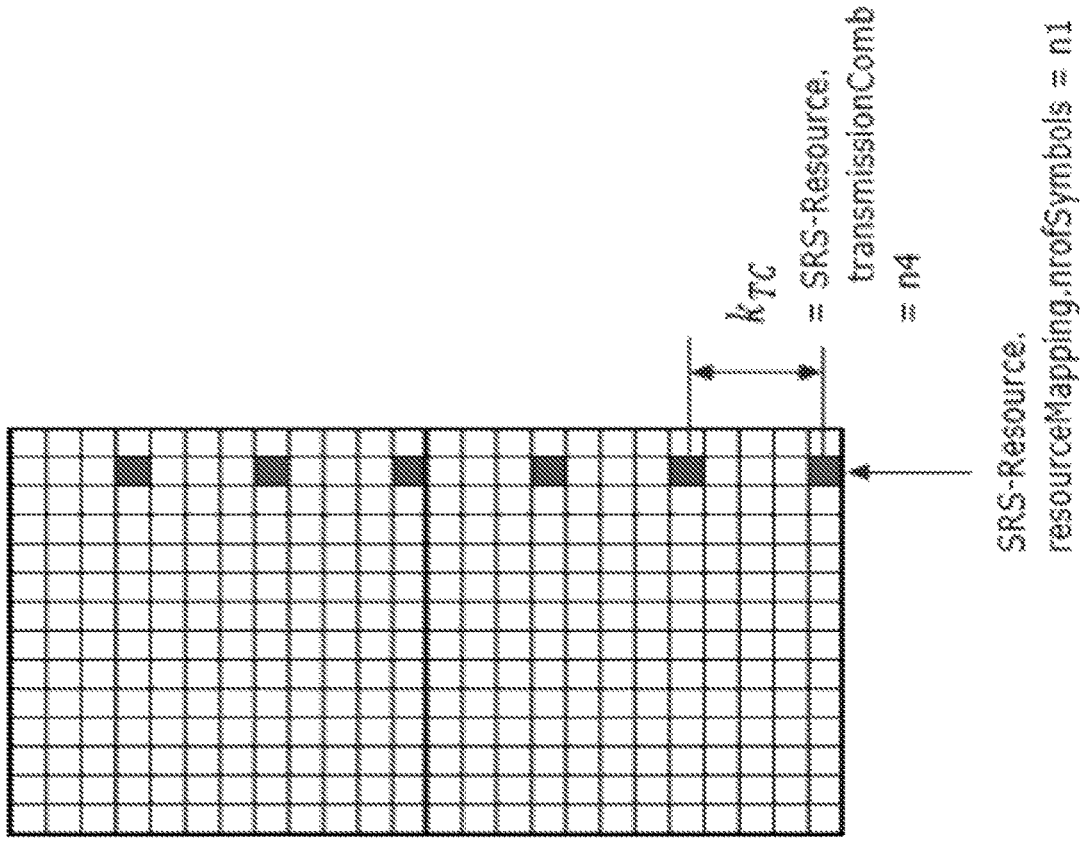
FIG. 15 is another example of parameters of sounding reference signal resource allocation in the time domain according to some embodiments of the present disclosure.
Figure 14:
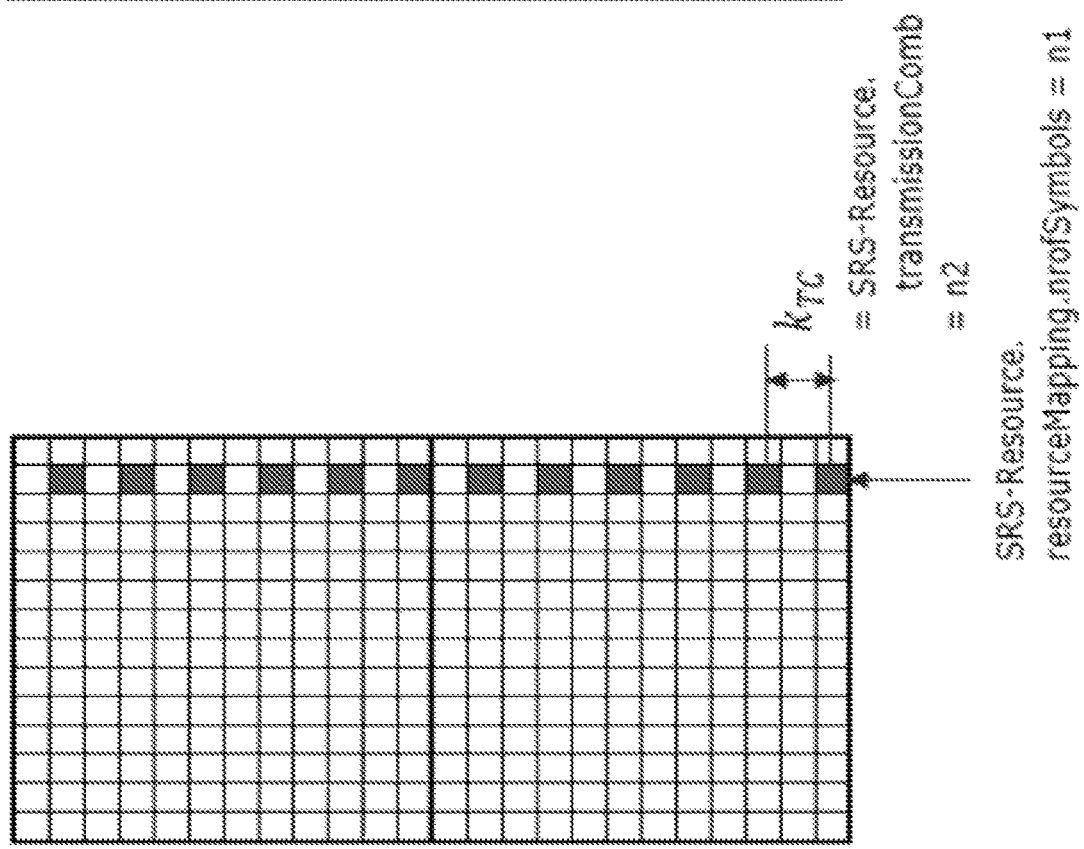
FIG. 14 is an example of parameters of sounding reference signal resource allocation in the time domain according to some embodiments of the present disclosure.
Figure 17:
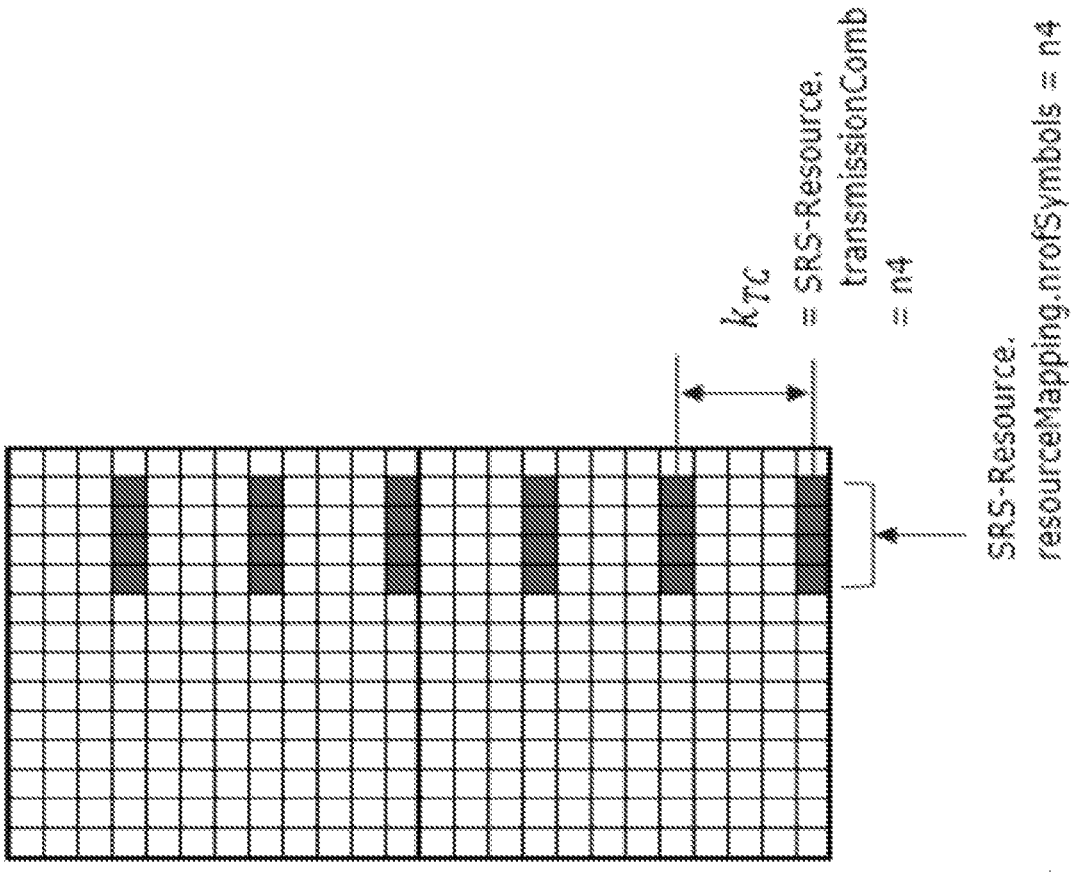
FIG. 17 is another example of parameters of sounding reference signal resource allocation in the time domain according to some embodiments of the present disclosure.
Figure 16:
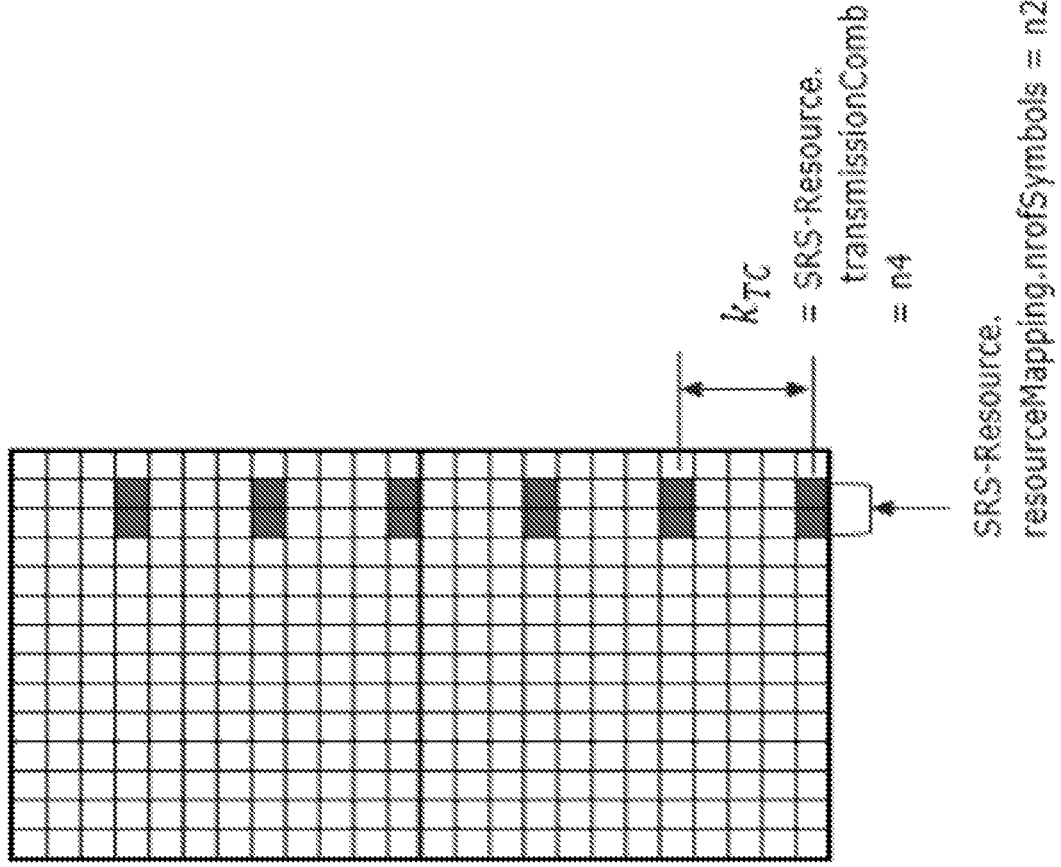
FIG. 16 is another example of parameters of sounding reference signal resource allocation in the time domain according to some embodiments of the present disclosure.

FIG. 14 is an example of parameters of SRS resource allocation in the time domain according to some embodiments of the present disclosure. FIG. 15 is another example of parameters of SRS resource allocation in the time domain according to some embodiments of the present disclosure. FIG. 16 is still another example of parameters of SRS resource allocation in the time domain according to some embodiments of the present disclosure. FIG. 17 is yet another example of parameters of SRS resource allocation in the time domain according to some embodiments of the present disclosure.

Figure 20:
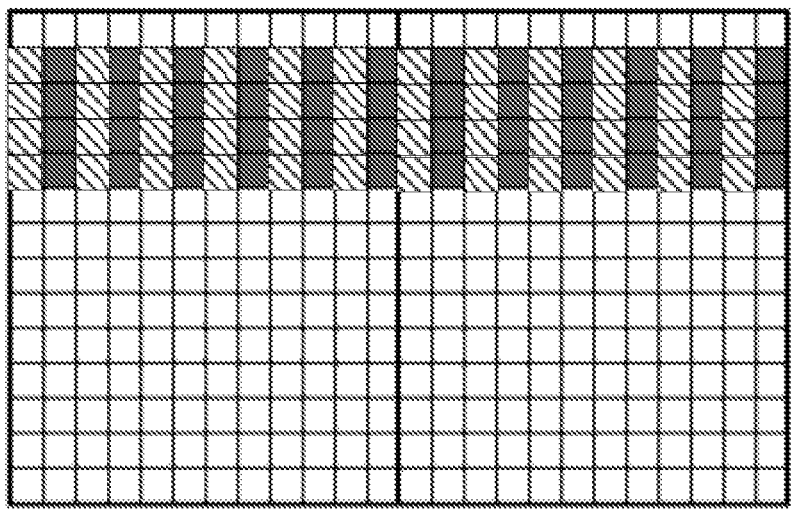
FIG. 20 is an illustration of an example comb 2 configuration in the frequency domain according to some embodiments of the present disclosure.
Figure 19:
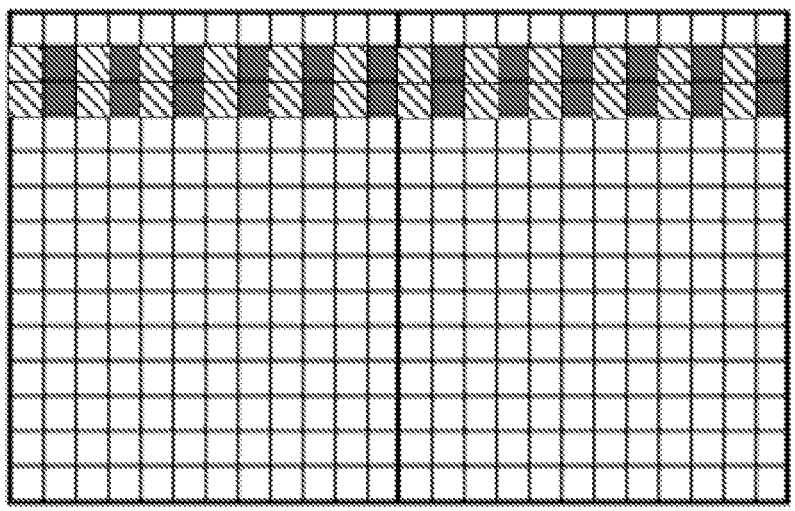
FIG. 19 is an illustration of an example comb 2 configuration in the frequency domain according to some embodiments of the present disclosure.
Figure 18:
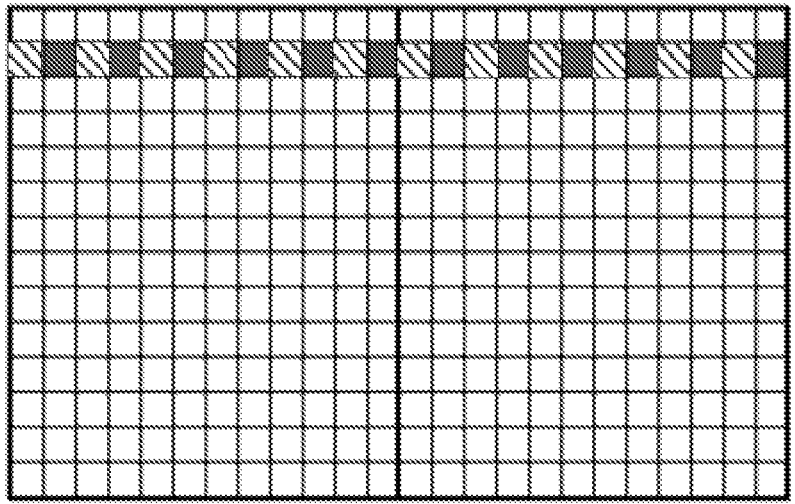
FIG. 18 is an example of a comb 2 configuration in the frequency domain according to some embodiments of the present disclosure.

FIG. 18 is an example of a comb 2 configuration in the frequency domain according to some embodiments of the present disclosure. FIG. 19 is another example of a comb 2 configuration in the frequency domain according to some embodiments of the present disclosure. FIG. 20 is another example of a comb 2 configuration in the frequency domain according to some embodiments of the present disclosure.

Figure 23:
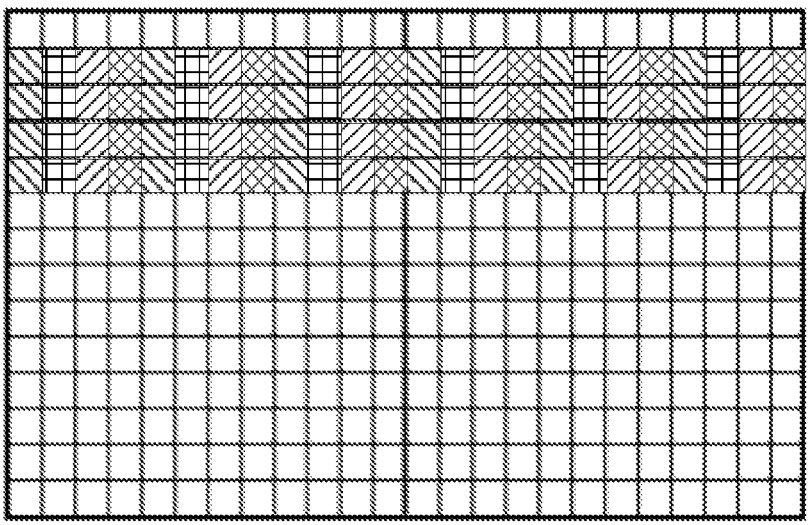
FIG. 23 is an illustration of an example comb 4 configuration in the frequency domain according to some embodiments of the present disclosure.
Figure 22:
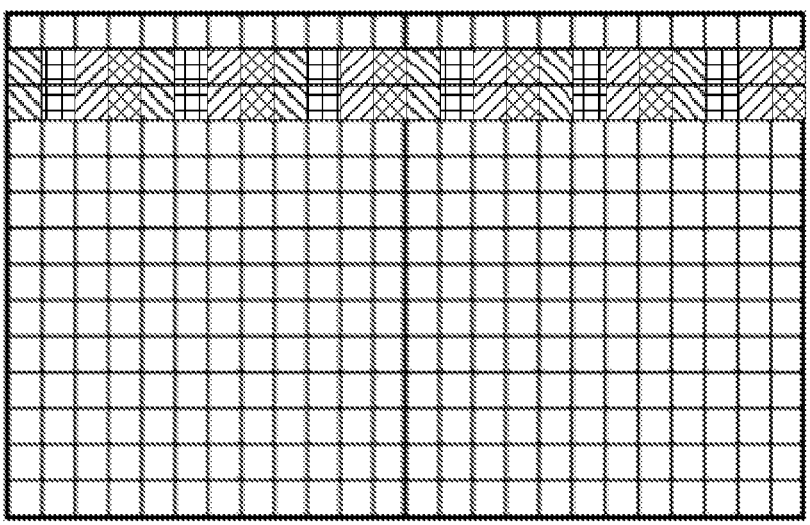
FIG. 22 is an illustration of an example comb 4 configuration in the frequency domain according to some embodiments of the present disclosure.
Figure 21:
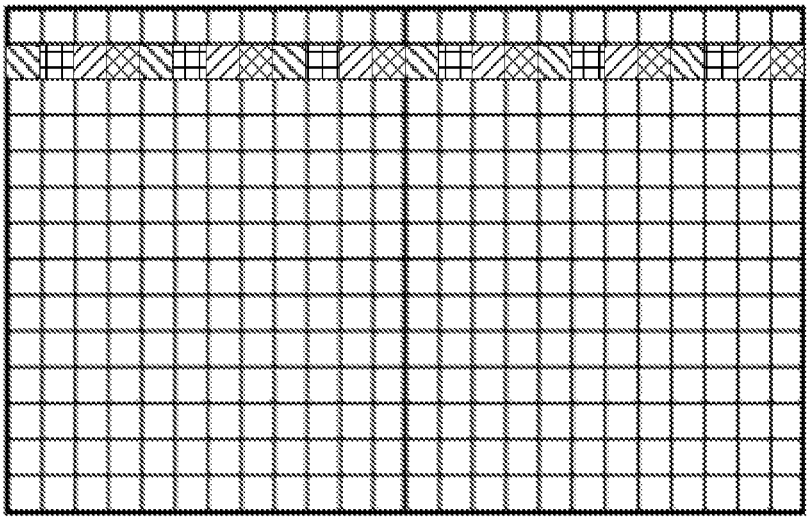
FIG. 21 is an illustration of an example comb 4 configuration in the frequency domain according to some embodiments of the present disclosure.

FIG. 21 is an example of a comb 4 configuration in the frequency domain according to some embodiments of the present disclosure. FIG. 22 is another example of a comb 4 configuration in the frequency domain according to some embodiments of the present disclosure. FIG. 23 is another example of a comb 4 configuration in the frequency domain according to some embodiments of the present disclosure.

Different hatching patterns correspond to different SRS signal numbers in FIGS. 21-23.

Since SRS resources are positioned in a certain interval in the frequency domain similar to the manner shown with respect to the time domain in FIGS. 14-17, multiple SRS may be interleaved (multiplexed) along the frequency domain occupying the same OFDM symbols as shown in FIGS. 18-20 and 21-23.

For a comb 2 configuration, two SRS signals may be multiplexed as shown in FIGS. 18-20. For a comb 4 configuration, a maximum of 4 SRS signals may be multiplexed as shown in FIGS. 21-23.

SRS Bandwidth Configuration

Figure 24:
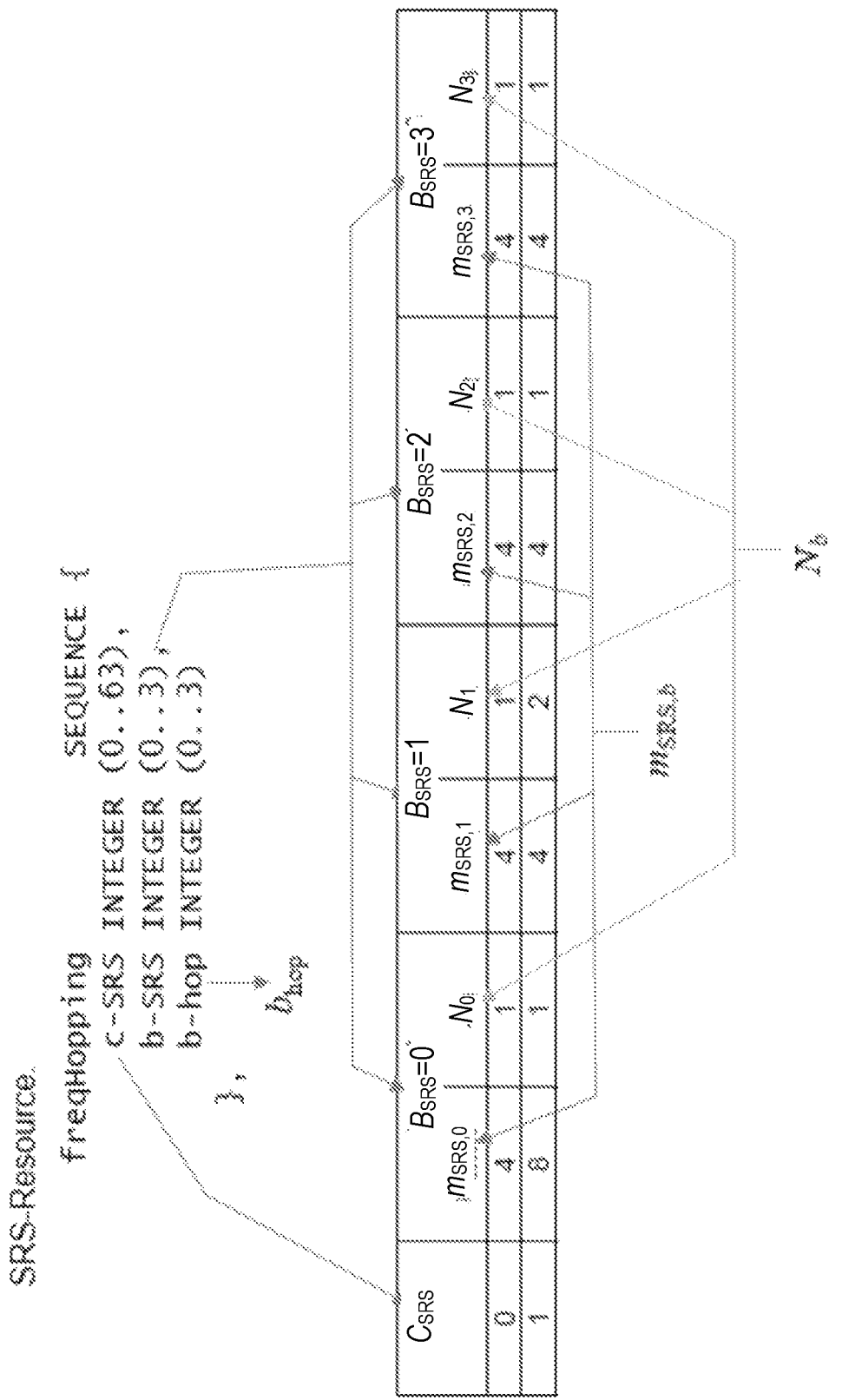
FIG. 24 is an illustration of an example sounding reference signal bandwidth configuration definition according to some embodiments of the present disclosure.

FIG. 24 is an illustration of an example sounding reference signal bandwidth configuration definition according to some embodiments of the present disclosure.

Some factors defining the location and bandwidth of SRS may be defined for example by 3GPP TS 38.211-Table 6.4.1.4.3-1. Some of the Radio Resource Control (RRC) parameters determine which row of the table is used for a specific SRS Resource set as illustrated in FIG. 24.

Some Examples

Example A1. A network node 16 configured to communicate with a wireless device 22 (WD 22), the network node 16 configured to, and/or comprising a radio interface 62 and/or comprising processing circuitry 68 configured to:

identify at least one common sounding reference signal (SRS) sequence for at least one Long Term Evolution (LTE) WD 22 and at least one New Radio (NR) WD 22; and allocate at least four physical resource blocks (PRB) reserved for the at least one common SRS sequence to a physical uplink shared channel (PUSCH) or a physical uplink control channel (PUCCH).

Example A2. The network node 16 of Example A1, wherein the at least one common SRS sequence further comprises the common Zadoff-Chu root sequences of the SRS for the at least one LTE wireless device 22 and at least one NR wireless device 22.

Example A3. The network node 16 of any one of Examples A1-A2, wherein the network node 16 and/or the radio interface 62 and/or the processing circuitry 68 is further configured to employ a single SRS process for uplink (UL) channel estimation of one of the at least one LTE wireless device 22 and at least one NR wireless device 22 in a shared spectrum of the at least one LTE wireless device 22 and at least one NR wireless device 22.

Example A4. The network node 16 of any one of Examples A1-A3, wherein the network node 16 and/or the radio interface 62 and/or the processing circuitry 68 is further configured to use an existing SRS configuration message in a Radio Resource Control (RRC) Connection Setup and an RRC Connection Reconfiguration to signal an SRS configuration.

Example A5. The network node 16 of any one of Examples A1-A4, wherein the network node 16 and/or the radio interface 62 and/or the processing circuitry 68 is further configured to partition the at least one SRS sequence between the LTE WD 22 and the NR WD 22 based at least on a relative ratio of the NR BWP to the total bandwidth of the shared spectrum.

Example A6. The network node 16 of any one of Examples A1-A4, wherein the network node 16 and/or the radio interface 62 and/or the processing circuitry 68 is further configured to partition the at least one SRS sequence based at least on part on a distribution of LTE WDs 22 and NR WDs 22.

Example A7. The network node 16 of any one of Examples A1-A5, wherein the network node 16 and/or the radio interface 62 and/or the processing circuitry 68 is further configured to re-use the SRS across different beam assignments.

Example A8. The network node 16 of Example 1, wherein the portioning of SRS sequences is between NR and LTE based on a fraction of wireless devices 22 for each of the NR and LTE deployments.

Example B1. A method implemented in a network node 16, the method comprising:

identifying at least one common sounding reference signal (SRS) sequence for at least one Long Term Evolution (LTE) WD 22 and at least one New Radio (NR) WD 22; and allocating at least four physical resource blocks (PRB) reserved for the at least one common SRS sequence to a physical uplink shared channel (PUSCH) or a physical uplink control channel (PUCCH).

Example B2. The method of Example B 1, wherein the at least one common SRS sequence further comprises the common Zadoff-Chu root sequences of the SRS for the at least one LTE wireless device 22 and at least one NR wireless device 22.

Example B3. The method of any one of Examples B1-B2, further comprising employing a single SRS process for uplink (UL) channel estimation of one of the at least one LTE wireless device 22 and at least one NR wireless device 22 in a shared spectrum of the at least one LTE wireless device 22 and at least one NR wireless device 22.

Example B4. The method of any one of Examples B1-B3, further comprising using an existing SRS configuration message in a Radio Resource Control (RRC) Connection Setup and an RRC Connection Reconfiguration to signal an SRS configuration Example B5. The method of any one of Examples B1-B4, further comprising partitioning the at least one SRS sequence between the LTE WD 22 and the NR WD 22 based at least on a relative ratio of the NR bandwidth part (BWP) to the total bandwidth of the shared spectrum.

Example B6. The method of any one of Examples B1-B4, wherein the network node 16 and/or the radio interface 62 and/or the processing circuitry 68 is further configured to partition the at least one SRS sequence based at least on part on a distribution of LTE WDs 22 and NR WDs 22.

Example B7. The method of any one of Examples B1-B5, further comprising re-using the SRS across different beam assignments.

Example C1. A wireless device 22 (WD 22) configured to communicate with a network node 16, the WD 22 configured to, and/or comprising a radio interface 82 and/or processing circuitry 84 configured to:

use at least four physical resource blocks (PRB) reserved for at least one sounding reference signal (SRS) sequence for a physical uplink shared channel (PUSCH) or a physical uplink control channel (PUCCH).

Example C2. The WD 22 of Example C1, wherein the at least one SRS sequence further comprises the common Zadoff-Chu root sequences of the SRS for at least one Long Term Evolution (LTE) WD 22 and at least one New Radio (NR) wireless device 22.

Example C3. The WD 22 of any one of Examples C1-C2, the WD 22 and/or the radio interface 82 and/or the processing circuitry 84 further configured to receive an SRS configuration in an existing SRS configuration message in at least one of a Radio Resource Control (RRC) Connection Setup and an RRC Connection Reconfiguration.

Example D1. A method implemented in a wireless device 22 (WD 22), the method comprising:

using at least four physical resource blocks (PRB) reserved for at least one sounding reference signal (SRS) sequence for a physical uplink shared channel (PUSCH) or a physical uplink control channel (PUCCH).

Example D2. The method of Example D1, wherein the at least one SRS sequence further comprises the common Zadoff-Chu root sequences of the SRS for at least one Long Term Evolution (LTE) WD 22 and at least one New Radio (NR) wireless device 22.

Example D3. The method of any one of Examples D1-D2, further comprising receiving an SRS configuration in an existing SRS configuration message in at least one of a Radio Resource Control (RRC) Connection Setup and an RRC Connection Reconfiguration.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| BWP | Bandwidth Part |
| CDM | Code division multiplexing |
| CRS | Common reference signal |
| CSI-RS | Channel state information reference signal |
| DMRS | Demodulation Reference Signal |
| HARQ | Hybrid automatic repeat request |
| LTE | Long term evolution |
| NR | New radio |
| NSA | Non-standalone |
| OFDM | Orthogonal frequency division multiplexing |
| PBCH | Physical broadcast channel |
| PDCCH | Physical downlink control channel |
| PDSCH | Physical downlink shared channel |
| PRACH | Physical random-access channel |
| PSS | Primary synchronization signal |
| RB | Resource block |
| SSB | Synchronization signal block |
| SSS | Secondary synchronization signal |
| SRS | Sounding reference signal |
| TRS | Tracking reference signal |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node, comprising:
   processing circuitry configured to:
   assign a plurality of wireless devices respective sounding reference signal (SRS) sequences of a common set of SRS sequences, the common set of SRS sequences being shared among a first radio access technology (RAT) and a second RAT; and
   receive SRS sequences according to the assignment of the respective SRS sequences of the common set of SRS sequences,
   wherein the common set of SRS sequences are configured for a time division duplex (TDD) same numerology non-standalone spectrum sharing between the first RAT and second RAT.

2. The network node of claim 1, wherein the common set of sequences are partitioned equally among first RAT wireless devices and second RAT wireless devices.

3. The network node of claim 1, wherein the common set of sequences are partitioned based at least on:
   a fraction of deployments of first RAT wireless devices and second RAT wireless devices, or a ratio of bandwidth parts (BWPs) associated with second RAT wireless devices to a total bandwidth of shared spectrum.

4. The network node of claim 1, wherein the processing circuitry is further configured to:
   determine a first region in a first RAT cell fails to overlap with second region in a second RAT cell; and
   configure the first region in the first RAT cell and the second region in the second RAT cell to reuse SRS sequences.

5. The network node of claim 1, wherein the assignment of the respective SRS sequences of the common set of SRS sequences is indicated using radio resource control (RRC) signaling, and/or
   wherein a first set of SRS sequences of the common set of SRS sequences is assigned to a first set of first RAT beams and a second set of SRS sequence of the common set of SRS sequence is assigned to a second set of second RAT beams.

6. A method implemented by a network node, comprising:
   assigning a plurality of wireless devices respective sounding reference signal (SRS) sequences of a common set of SRS sequences, the common set of SRS sequences being shared among a first radio access technology (RAT) and a second RAT; and
   receiving SRS sequences according to the assignment of the respective SRS sequences of the common set of SRS sequences,
   wherein the common set of SRS sequences are configured for a time division duplex (TDD) same numerology non-standalone spectrum sharing between the first RAT and second RAT.

7. The method of claim 6, wherein the common set of sequences are partitioned:
   equally among first RAT wireless devices and second RAT wireless devices, or
   based at least on a fraction of deployments of first RAT wireless devices and second RAT wireless devices, or
   based at least on a ratio of bandwidth parts (BWPs) associated with second RAT wireless devices to a total bandwidth of shared spectrum.

8. The method of claim 6, further comprising:
   determining a first region in a first RAT cell fails to overlap with second region in a second RAT cell; and
   configuring the first region in the first RAT cell and the second region in the second RAT cell to reuse SRS sequences.

9. The method of claim 6, wherein the assignment of the respective SRS sequences of the common set of SRS sequences is indicated using radio resource control (RRC) signaling, and/or
   wherein a first set of SRS sequences of the common set of SRS sequences are assigned to a first set of first RAT beams and a second set of SRS sequence of the common set of SRS sequence are assigned to a second set of second RAT beams.

10. A wireless device configured to communicate with a network node, the wireless device comprising:
    processing circuitry configured to:
      receive an assignment of a first sounding reference signal (SRS) sequence of a common set of SRS sequences, the common set of SRS sequences being shared among a first radio access technology (RAT) and a second RAT; and
      transmit the first SRS sequence according to the assignment,
    wherein the common set of SRS sequences are configured for a time division duplex (TDD) same numerology non-standalone spectrum sharing between the first RAT and second RAT.

11. The wireless device of claim 10, wherein the common set of sequences are partitioned equally among first RAT wireless devices and second RAT wireless devices.

12. The wireless device of claim 10, wherein the common set of sequences are partitioned based at least on a fraction of deployments of first RAT wireless devices and second RAT wireless devices, or
    wherein the common set of sequences are partitioned based at least on a ratio of bandwidth parts (BWPs) associated with second RAT wireless devices to a total bandwidth of shared spectrum.

13. The wireless device of claim 10, wherein the assignment is indicated using radio resource control (RRC) signaling, and/or
    wherein a first set of SRS sequences of the common set of SRS sequences are assigned to a first set of first RAT beams and a second set of SRS sequence of the common set of SRS sequence are assigned to a second set of second RAT beams.

14. A method implemented by a wireless device that is configured to communicate with a network node, the method comprising:
    receiving an assignment of a first sounding reference signal (SRS) sequence of a common set of SRS sequences, the common set of SRS sequences being shared among a first radio access technology (RAT) and a second RAT; and
    transmitting the first SRS sequence according to the assignment,
    wherein the common set of SRS sequences are configured for a time division duplex (TDD) same numerology non-standalone spectrum sharing between the first RAT and second RAT.

15. The method of claim 14, wherein the common set of sequences are partitioned:
    equally among first RAT wireless devices and second RAT wireless devices, or
    based at least on a fraction of deployments of first RAT wireless devices and second RAT wireless devices, or
    based at least on a ratio of bandwidth parts (BWPs) associated with second RAT wireless devices to a total bandwidth of shared spectrum.

16. The method of claim 14, wherein the assignment is indicated using radio resource control (RRC) signaling, and/or
    wherein a first set of SRS sequences of the common set of SRS sequences are assigned to a first set of first RAT beams and a second set of SRS sequence of the common set of SRS sequence are assigned to a second set of second RAT beams.

* * * * *